United States Patent
Saman et al.

(10) Patent No.: US 8,044,707 B2
(45) Date of Patent: *Oct. 25, 2011

(54) VDD/5 OR VDD/6 CHARGE-PUMP

(75) Inventors: Hynek Saman, Beroun (CZ); Jim Brown, Livingston (GB)

(73) Assignee: Dialog Semiconductor GmbH, Kirchheim/Teck-Nabern (DE)

(*) Notice: Subject to any disclaimer, the term of this patent is extended or adjusted under 35 U.S.C. 154(b) by 58 days.

This patent is subject to a terminal disclaimer.

(21) Appl. No.: 12/589,021

(22) Filed: Oct. 16, 2009

(65) Prior Publication Data

US 2011/0084757 A1    Apr. 14, 2011

(30) Foreign Application Priority Data

Oct. 9, 2009  (EP) .................................... 09368037

(51) Int. Cl.
*G05F 1/10* (2006.01)
(52) U.S. Cl. .......................................... 327/536; 363/60
(58) Field of Classification Search .................. 327/536; 363/59–60
See application file for complete search history.

(56) References Cited

U.S. PATENT DOCUMENTS

| | | | |
|---|---|---|---|
| 5,481,447 A * | 1/1996 | Caris et al. ....................... 363/60 |
| 6,922,097 B2 | 7/2005 | Chan et al. |
| 7,199,641 B2 * | 4/2007 | Wei ............................... 327/427 |
| 7,456,677 B1 * | 11/2008 | Rao et al. ...................... 327/536 |
| 7,830,209 B1 * | 11/2010 | Woodford et al. ............. 330/297 |
| 2008/0044041 A1 | 2/2008 | Tucker et al. |
| 2008/0088179 A1 | 4/2008 | Oyama et al. |
| 2008/0116979 A1 | 5/2008 | Lesso et al. |
| 2008/0150621 A1 | 6/2008 | Lesso et al. |
| 2008/0159567 A1 * | 7/2008 | Lesso et al. ................... 381/120 |

FOREIGN PATENT DOCUMENTS

| | | |
|---|---|---|
| EP | 1 608 066 | 12/2005 |
| GB | 2 455 524 | 6/2009 |

OTHER PUBLICATIONS

European Search Report 09368044.5-2207, Mail Date—Nov. 26, 2010, Dialog Semiconductor GmbH.
Co-pending US Patent DS09-010, U.S. Appl. No. 12/589,020, filed Oct. 16, 2009. "Reduced Capacitor Charge-Pump," assigned to the same assignee as the present invention.

* cited by examiner

*Primary Examiner* — Thomas J Hiltunen
(74) *Attorney, Agent, or Firm* — Saile Ackerman LLC; Stephen B. Ackerman

(57) ABSTRACT

Systems and methods to achieve a charge pump for generating from single supply voltage energy efficient supply voltages having a value of $\pm\frac{1}{6}$ Vdd, $\pm\frac{1}{5}$ Vdd, $\pm\frac{1}{4}$ Vdd, $\pm\frac{1}{3}$ Vdd, $\pm\frac{1}{2}$ Vdd or $\pm 1$ Vdd that are symmetrical around ground voltage have been disclosed. The charge pump requires two flying capacitors only. The charge pump generates positive and negative supply voltages following a 1/N ratio of Vdd voltage, i.e. +−Vdd/N, and can be generalized to generate +/−Vdd/$2^N$ voltages. This is especially useful for supplying class-G amplifiers with a voltage or power, which is just enough e.g. for an audio signal to be correctly generated at the output of the amplifier.

26 Claims, 4 Drawing Sheets

FIG. 2

| | S0 | S1 | S2 | S3 | S4 | S5 | S6 | S7 | S8 | S9 | S10 | S11 | S12 | S13 | S14 |
|---|---|---|---|---|---|---|---|---|---|---|---|---|---|---|---|
| Phase1 | ON | | | | | | | | | ON | ON | ON | ON | | |
| Phase2 | | | | | | | ON | ON | | ON | ON | | | ON | |
| Phase3 | | | | ON | ON | | | ON | ON | | | | | ON | |
| Phase4 | ON | | | | ON | | ON | | | | ON | | | ON | |

FIG. 3

| | S0 | S1 | S2 | S3 | S4 | S5 | S6 | S7 | S8 | S9 | S10 | S11 | S12 | S13 | S14 |
|---|---|---|---|---|---|---|---|---|---|---|---|---|---|---|---|
| Phase1 | ON | | | | | | | | | ON | ON | ON | | | |
| Phase2 | | | | | | | | ON | | ON | ON | ON | ON | | ON |
| Phase3 | | | | ON | ON | | | | ON | | | | | ON | ON |
| Phase4 | ON | | | | | | ON | | | | | | | ON | |

VDD/5 OR VDD/6 CHARGE-PUMP

This application is related to U.S. patent application Ser. No. 12/589,020, filed on Oct. 16, 2009, which is incorporated by reference herein and assigned to the same assignee as the present invention.

BACKGROUND OF THE INVENTION (1) Field of the Invention

This invention relates generally to DC-to-DC converters and relates more specifically to DC-to-DC converters generating output symmetrical positive and negative supply voltages from a single supply voltage using charge pump technique.

(2) Description of the Prior Art

Generating energy efficient reduced supply voltages is key in modern audio systems to be able to generate lower supply voltages when low power consumption for audio playback is required. It is also important that the generated supply voltages have to be symmetrical around ground so that AC coupling capacitors are not required on the audio outputs. These are called "True ground outputs". Amplifiers adjusting their supply voltages dependent upon the output signal are called "Class-G" amplifiers. The Class-G amplifier has several power rails at different voltages, and switches between rails as the signal output approaches each. Thus the amplifier increases efficiency by reducing the wasted power at the output transistors.

For electronic devices such as "Class-G" amplifiers symmetrical positive and negative supply voltages from a single input supply voltage (Vdd) should be generated, wherein the resulting positive voltage (Vp) and negative voltage are according a 1/N ratio of Vdd (Vp, Vn=+/−Vdd/N).

It is a challenge for the designers of charge pumps generating symmetrical output voltages requiring a minimum number of flying capacitors.

There are known patents dealing with charge pumps generating symmetrical voltages.

WO Patent 2006/043479 to Oyama Manabu et al. discloses a switching power supply capable of outputting a plurality of voltages through simple circuitry. The switching power supply steps up or inverts an input voltage Vin applied to an input terminal before outputting it from a first output terminal and a second output terminal. When first and fourth switches SW1 and SW4 are turned on, a flying capacitor Cf is charged. When second and fifth switches and are turned on, charges of the flying capacitor Cf are transferred to a first output capacitor Co1. When third and sixth switches and are turned on, charges of the flying capacitor are transferred to a second output capacitor. Input voltage is outputted as a first output voltage Vout1 from the first output terminal, and inverted input voltage −Vin is outputted as a second output voltage Vout2 from the second output terminal.

U.S. patent (U.S. Pat. No. 6,922,097 to Chan et al.) proposes a symmetric dual-voltage charge pump and its control circuit generating bipolar output voltages. The charge pump converts a unipolar power source to a set of dual-voltage outputs of opposite polarity that are completely independent of each other. The charge pump includes two voltage-boosting transfer capacitors and two output capacitors. Two-phase operation generates an increased-magnitude output voltage of a negative polarity and another two phases of operation generate an increased output voltage of a positive polarity. The charge pump selectively charges one or both of the bipolar outputs with individual 2-phase charge cycles or with a sequence of charge cycles. When controlled by comparators with unequal reference voltages, the charge pump can force the bipolar outputs to unequal positive and negative voltages. Charge pumping is faster since only 2 phases are needed for charging either the positive or negative output.

U.S. Patent Application (US 2008/0116979 to Lesso et al.) proposes a signal amplifying circuit and associated methods and apparatuses, the circuit comprising: a signal path extending from an input terminal to an output terminal, a gain controller arranged to control the gain applied along the signal path in response to a control signal; an output stage within the signal path for generating the output signal, the output stage having a gain that is substantially independent of its supply voltage, and a variable voltage power supply comprising a charge pump for providing positive and negative output voltages, the charge pump comprising a network of switches that is operable in a number of different states and a controller for operating the switches in a sequence of the states so as to generate positive and negative output voltages together spanning a voltage approximately equal to the input voltage.

Furthermore Patent GB 245 5524 to MacFarlane et al. describes a charge pump circuit and method of generating a voltage supply Vout+, Vout− from a single input supply+ VDD, which comprises connecting at least one flying capacitor (Cf) to at least one reservoir capacitor (CR1, CR2) and to the input supply in repeated cycles so as to generate a voltage on the reservoir capacitor. The cycles differ between at least two modes so that each mode generates a different voltage on the reservoir capacitor. The method includes changing from an existing mode a new mode during operation, and operating in at least one transitional mode for a period prior to fully entering the new mode.

It should be understood that prior art, e.g. GB 245 5524 to MacFarlane et al., requires for generating positive and negative +/−Vdd/N voltages (N−1) flying capacitors. For instance in order to generate +/−Vdd/6 voltages (N=6) five flying capacitors are required. The problem is that each flying capacitor is an expensive external component and requires extra device pins. Therefore solutions requiring less flying capacitors are desired.

SUMMARY OF THE INVENTION

A principal object of the present invention is to reduce the number of flying capacitors required in charge pumps.

A further object of the invention is to generate symmetrical positive and negative output voltages from a single supply voltage using a charge pump.

A further object of the invention is to achieve a charge pump wherein the ratio between generated output voltages and the supply voltage is ⅙ and ⅕.

A further object of the invention is to achieve a charge pump wherein the ratio between generated output voltages and the supply voltage is $Vdd/2^N$ with just N flying capacitors only, with or without feedback control.

A further object of the invention is to achieve an internal or an external charge pump, allowing a reduced number of external components and reduced pin count compared to prior art.

In accordance with the objects of this invention a method for generating from a single supply voltage Vdd energy efficient supply voltages being symmetrical around ground voltage has been achieved, The method invented comprises, firstly, the following steps: (1) (1) providing an input voltage Vdd and a charge pump circuit, having a positive and a negative output node, comprising a digital controller, a set of switches, two flying capacitors, and two reservoir capacitors, (2) setting output voltage modes desired on the digital controller, and (3) setting switches in order to put voltages on both flying capacitors and on at least one output port according to one or more equations describing a first phase of an actual output voltage mode of the charge pump. Furthermore the method invented comprises: (4) setting switches in order to put voltages on both flying capacitors and on at least one output port according to one or more equations describing a second phase of an actual output voltage mode of the charge pump, (5) setting switches in order to put voltages on both flying capacitors and on one or more output port according to one or more equations describing a third phase of an actual output voltage mode of the charge pump, and (6) setting switches in order to put voltages on both flying capacitors and on one or more output port according to one or more equations describing a fourth phase of an actual output voltage mode of the charge pump. Finally the method invented comprises (7) go to step (8) if charge pump is on, else go to step (10), (8) go to step (9) if output voltage mode is to be changed, else go to step (3), (9) change output voltage mode and go to step (3); and (10) end.

In accordance with the objects of this invention a charge pump generating energy efficient supply voltages having a value of fractions of VDD voltage being symmetrical around ground voltage has been achieved. The charge pump invented firstly comprises: a digital controller, controlling the operation of the charge pump in a way that the charge pump is providing just the amount of power required by a stage supplied by the charge pump, a first input port connected to Vdd voltage, a second input port connected to ground, a positive output node, and a negative output node. Furthermore the charge pump comprises two reservoir capacitors, wherein a first reservoir capacitor is connected between the positive output node of the charge pump and ground and a second reservoir capacitor is connected between the negative output node of the charge pump and ground, two flying capacitors, and a set of switches activating charging of two flying capacitors and connecting first or second plates of the two flying capacitors to the positive and negative output nodes wherein the set of switches and the related charging of the two flying capacitors are controlled by the digital controller in way that the positive and negative output nodes supply symmetrical output voltages required.

BRIEF DESCRIPTION OF THE DRAWINGS

In the accompanying drawings forming a material part of this description, there is shown:

FIG. 2 is a table illustrating the switching sequence for the +/−Vdd/5 mode.

FIG. 3 is a table illustrating the switching sequence for the +/−Vdd/6 mode.

DESCRIPTION OF THE PREFERRED EMBODIMENTS

Figure 1:
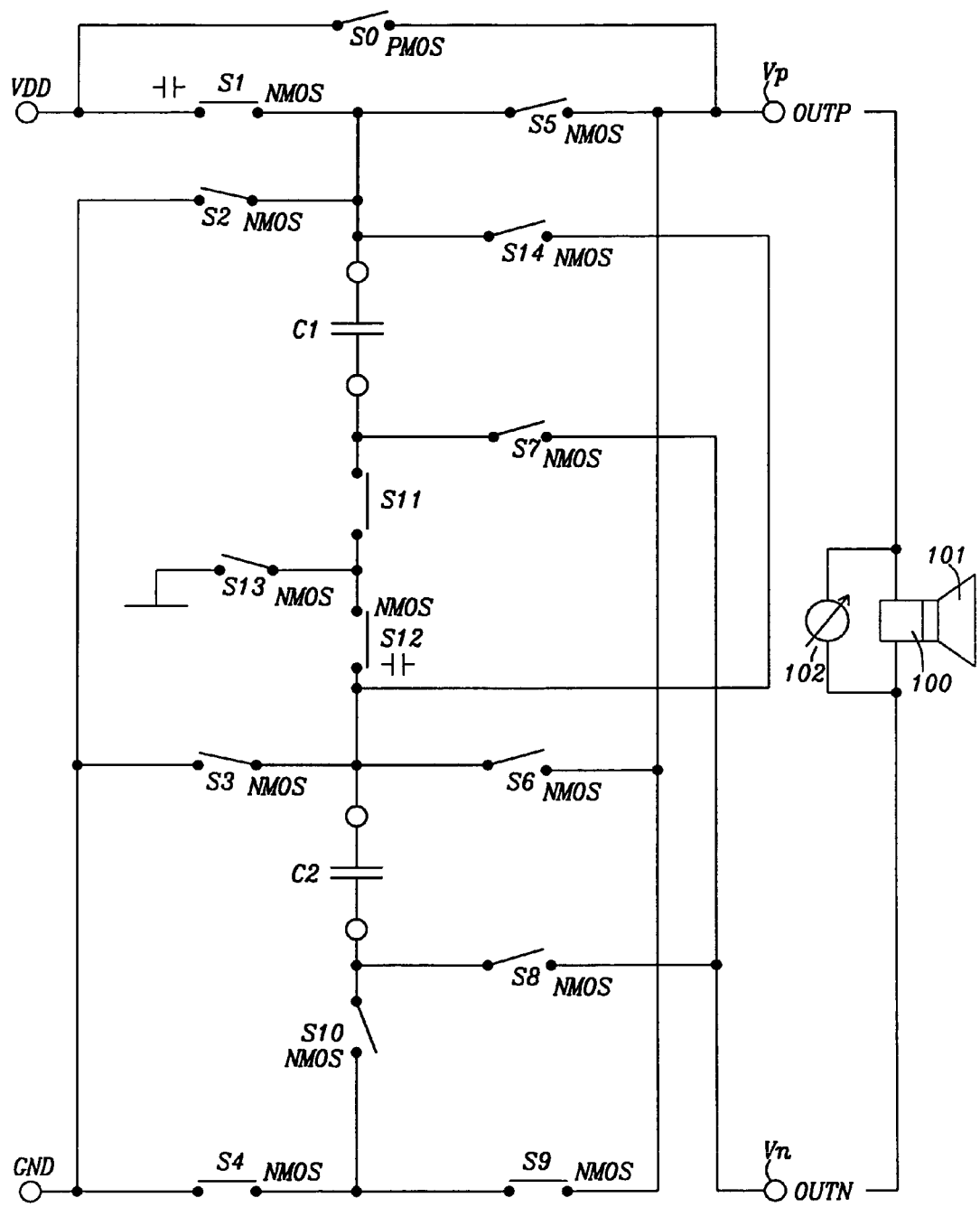
FIG. 1 illustrates an overall block diagram showing switches for generating the symmetrical output voltages CSP (positive) and CSN (negative).

Circuits and methods for generating output symmetrical positive and negative supply voltages from a single supply voltage (Vdd) by using charge pump technique are disclosed, wherein the resulting positive output voltage (Vp) and negative output voltage (Vn) have a 1/N ratio of Vdd (Vp, Vn=+/−Vdd/N). The methods disclosed can be generalized to generate +/−Vdd/$2^N$ output supply voltages requiring N flying capacitors. More specifically the charge pumps invented generate symmetrical output voltages having a value of ±⅙, ±⅕, ±¼, ±⅓, ±½, or ±1 Vdd voltage FIG. 1 illustrates an overall block diagram of the charge pump 100 showing switches for generating the symmetrical output voltages Vp (positive) and Vn (negative). Compared to the U.S. patent application Ser. No. 12/589,020, filed on Oct. 16, 2009, which is incorporated by reference herein and assigned to the same assignee as the present invention an additional switch has been added to the charge pump in order to generate ±⅙, or ±⅕ Vdd voltage. It should be understood that the present invention is capable to supply in four phases ±¼, ±⅓, ±½, or ±1 Vdd voltage each in four phases as well as disclosed in the U.S. patent application Ser. No. 12/589,020

The charge pump of FIG. 1 comprises a set of 15 switches and two external flying capacitors C1 and C2 two input nodes connected to Vdd voltage and correspondently to ground voltage, and two output nodes OUTP and OUTN for the symmetrical positive and negative output voltages. Furthermore the charge pump comprises (not shown) totally two external reservoir capacitors, wherein a first reservoir capacitor is connected between the positive output node OUTP and ground and a second reservoir capacitor is connected between the negative output node OUTN and ground, and a digital controller (not shown). In a preferred embodiment of the invention the charge pump is part of a headphone amplifier providing just the amount of power required according to gain settings. In normal operation the charge pump is driven according to the audio volume using two flying capacitors C1 and C2 only and two reservoir capacitors. The charge pump can operate in six basic modes supplying output voltages Vp and Vn having a value of ±⅙, ±⅕, ±¼, ±⅓, ±½, or ±1 Vdd voltage FIG. 1 shows also a schematic overview of the switches involved to realize the various operating modes. Totally 15 switches are employed. Some of the switches are integrated bulk switches.

The switches shown in FIG. 1 have the following properties:

Switch S0 is a PMOS switch.

Figure 6:
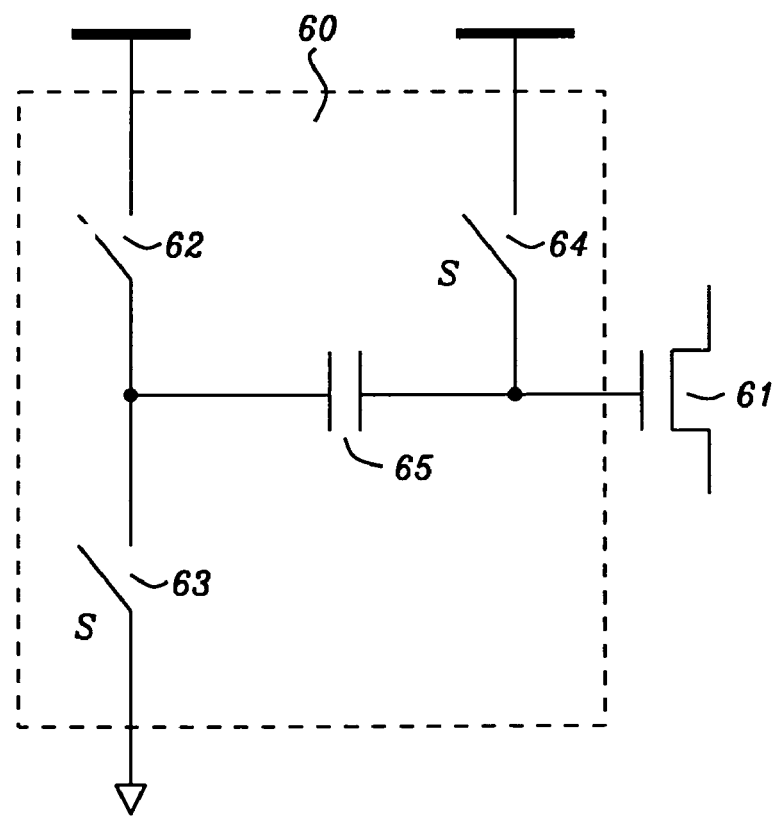
FIG. 6 illustrates an integrated charge pump providing the necessary gate-source voltage for a transistor switch

Switches S1 and S12 are NMOS switches with internal integrated charge pump, signified in FIG. 1 by a capacitor sign, where an internal capacitor in each switch is charged to Vdd voltage and then connected between source and gate of a power NMOS switch to switch ON, in order to switch OFF, the gate is shorted to source. These switches are designed to operate only with terminal voltages between 0 to Vdd. FIG. 6 illustrates a preferred embodiment of such an integrated charge pump 60 providing the necessary gate-source voltage for transistor switch 61. The charge pump 60 comprises an capacitor 65 and three switches 62-64. Other arrangements of switches and one or more capacitors are also possible to implement a charge pump for such a purpose.

Figure 5:
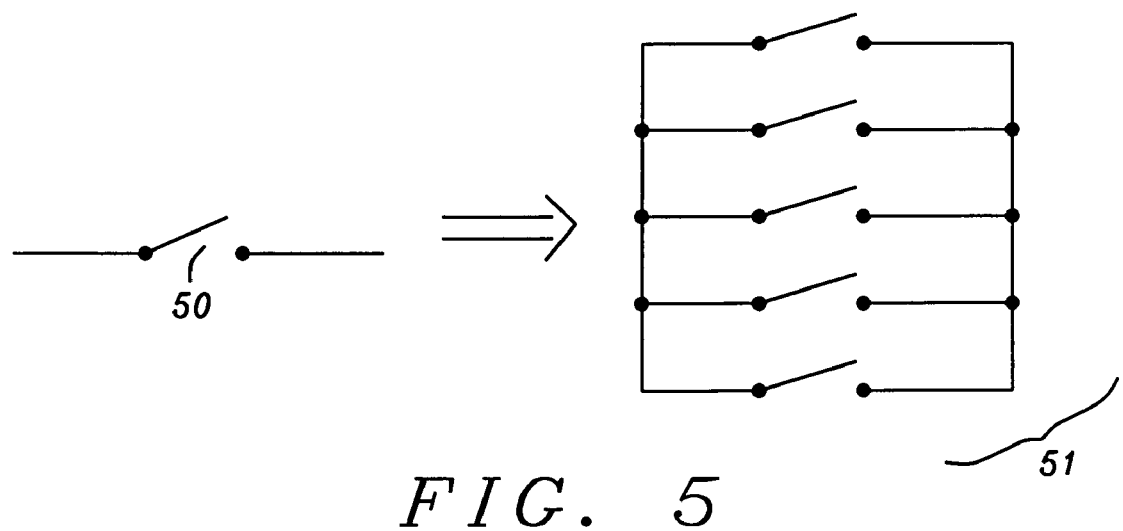
FIG. 5 illustrates a replacement of a single switch by e.g. 5 smaller switches in parallel.

A detection circuit 102 at the outputs of Charge Pump (CP) detects a drop of voltage due to load. In case of a drop of voltage the frequency of the charge pump is adjusted and when a minimum of a set frequency is reached the size of switches is reduced. In the preferred embodiment the size of switches can be reduced to 20% in order to reduce power consumption. FIG. 5 illustrates a replacement of a single switch 50 by e.g. 5 smaller switches 51 in parallel. Each switch is split to 5 switches in parallel, allowing reducing the size down to only 20%. It is obvious that any other number of split switches could be used as well.

Switches S2, S3, S4, S9, and S13 are NMOS switches driven by an inverter stage.

Switches S5, S6, and S14 are similar to switches S1 and S12 but they have a switchable bulk dependent upon an actual output voltage mode of the charge pump operation.

Switches S7, S8, S10 and S11 are NMOS switches with an internal integrated charge pump and can operate with any voltage on switch terminal not only 0 . . . Vdd, but also with any −Vdd . . . Vdd voltage.

The switches of the charge pump 100 are controlled by a digital controller block such the voltages Vp and Vn on the pins OUTP and OUTN are just enough for the audio signal to be correctly generated at the output of the class-G audio amplifier 100 driving a loudspeaker of the headphone 101. The charge pump 100 is controlled in a class-G type regulation by changing the frequency of the switch controls and the width (full/partial) of the switch devices.

Vp is the positive supply voltage of the amplifier and Vn is the negative supply voltage of the amplifier.

With the present invention it is possible to achieve dividing the power supply Vdd by either 5 or 6 in four phases using two flying capacitors only.

The +/−Vdd/5 output voltage mode is described by following equations, wherein VC1 is a voltage across flying capacitor C1, VC2 is a voltage across flying capacitor C2, Vp is the voltage at the positive output node OUTP, and Vn is the voltage at the negative output node OUTN (it should be understood that in the following equations Vn is the voltage in direction ground to negative output port, hence it is a positive voltage):

Phase1: A) VC1+VC2+Vp=Vdd
Phase2: B) VC1=VC2+Vp+Vn
Phase3: C) VC2=Vn
Phase4: D) VC2=Vp The solution of these equations for the +/−Vdd/5 output voltage mode yield are: VC1=⅗ Vdd, VC2=Vdd/5, Vp=Vdd/5, Vn=Vdd/5.

FIG. 2 is a table illustrating details of the switching sequence for the +/−Vdd/5 mode. In phase 1 switch S1 is closed connecting Vdd voltage to the top plate of the first floating capacitor C1. Switches S11 and S12 are also closed connecting the bottom plate of the first flying capacitor C1 to the top plate of the second flying capacitor CF2. Switches S9 and S10 are used to connect the bottom plate of the second flying capacitor CF2 to the positive output node OUTP. In this phase all other switches are open. This creates Vdd voltage on the top plate of CF1 and Vp voltage on the bottom plate of CF2.

In phase 2 the bottom plate of C1 is connected to the negative output node OUTN via switch S7 and the bottom plate of C2 is connected to the positive output node OUTP via switches S9 and S10. The top plate of C2 is connected to the top plate of C1 via switch S14. Switch 13 is closing in phase 2 in order to define a voltage level between switches S11 and S12, which are OFF in this phase.

In Phase 3 the top plate of C2 is connected to ground. The bottom plates of C1 and C2 are both connected to the negative output port OUTN via switches S8 and correspondently S7.

In phase 4 the top plate of C1 is connected to Vdd voltage via switch S1, the bottom plate of C2 is connected to the negative output port OUTN via switch S8 and the top plate of C2 is connected to OUTP via switch S6 causing voltage Vp to Vdd/6.

It should be noted that the phases 1-4 have all fixed duration. In a preferred embodiment all phases have duration of 500 ns. Other durations are possible as well.

The +/−Vdd/6 output voltage mode is described by following equations, wherein VC1 is a voltage across flying capacitor C1, VC2 is a voltage across flying capacitor C2, Vp is the voltage at the positive output node OUTP, and Vn is the voltage at the negative output node OUTN (as in regard of +−Vdd/5 Vn is the voltage in direction ground to negative output port, hence it is a positive voltage):

Phase1: A) VC1+VC2+Vp=Vdd
Phase2: B) VC1=VC2+Vp
Phase3: C) VC1=VC2+Vn
Phase4: D) VC2=Vp+Vn The solution of these equations for the +/−Vdd/6 output voltage mode yield: VC1=⅗ Vdd, VC2=⅖ Vdd, Vp=Vdd/6, Vn=Vdd/6.

FIG. 3 is a table illustrating details of the switching sequence for the +/−Vdd/6 mode. In phase 1 switch S1 is closed connecting Vdd voltage to the top plate of the first floating capacitor C1. Switches S11 and S12 are also closed connecting the bottom plate of the first flying capacitor C1 to the top plate of the second flying capacitor C2. Switches S9 and S10 are used to connect the bottom plate of the second flying capacitor C2 to the positive output node OUTP. In this phase all other switches are open. This creates Vdd voltage on the top plate of C1 and Vp voltage on the bottom plate of C2.

In phase 2 the bottom plate of C1 is connected to ground via switches S11 and S13, the bottom plate of C2 is connected to the positive output node OUTP via switches S9 and S10. The top plate of C2 is connected to the top plate of C1 via switch S14.

In Phase 3 the top plate of C2 is connected to ground. The bottom plate of C1 is connected to the negative output port OUTN via switch S7 and the bottom plate of C2 is connected to ground via switches S10 and S4. The top plate of C2 is connected to the top plate of C1 via switch S14.

In phase 4 the top plate of C1 is connected to Vdd voltage via switch S1, the bottom plate of C2 is connected to ground via switches S10 and S4 and the top plate of C2 is connected to OUTP via switch S6 and the top plate of C2 is connected via switch S6 to OUTP causing voltage Vp to Vdd/6.

It should be noted that the equations of the four phases and the correspondent solutions in order to generate output voltages having a value of (+−¼ Vdd, +−Vdd/3, +/−−½ Vdd and +/−Vdd are disclosed in US patent application Ser. No. 12/589,020.

Figure 4:
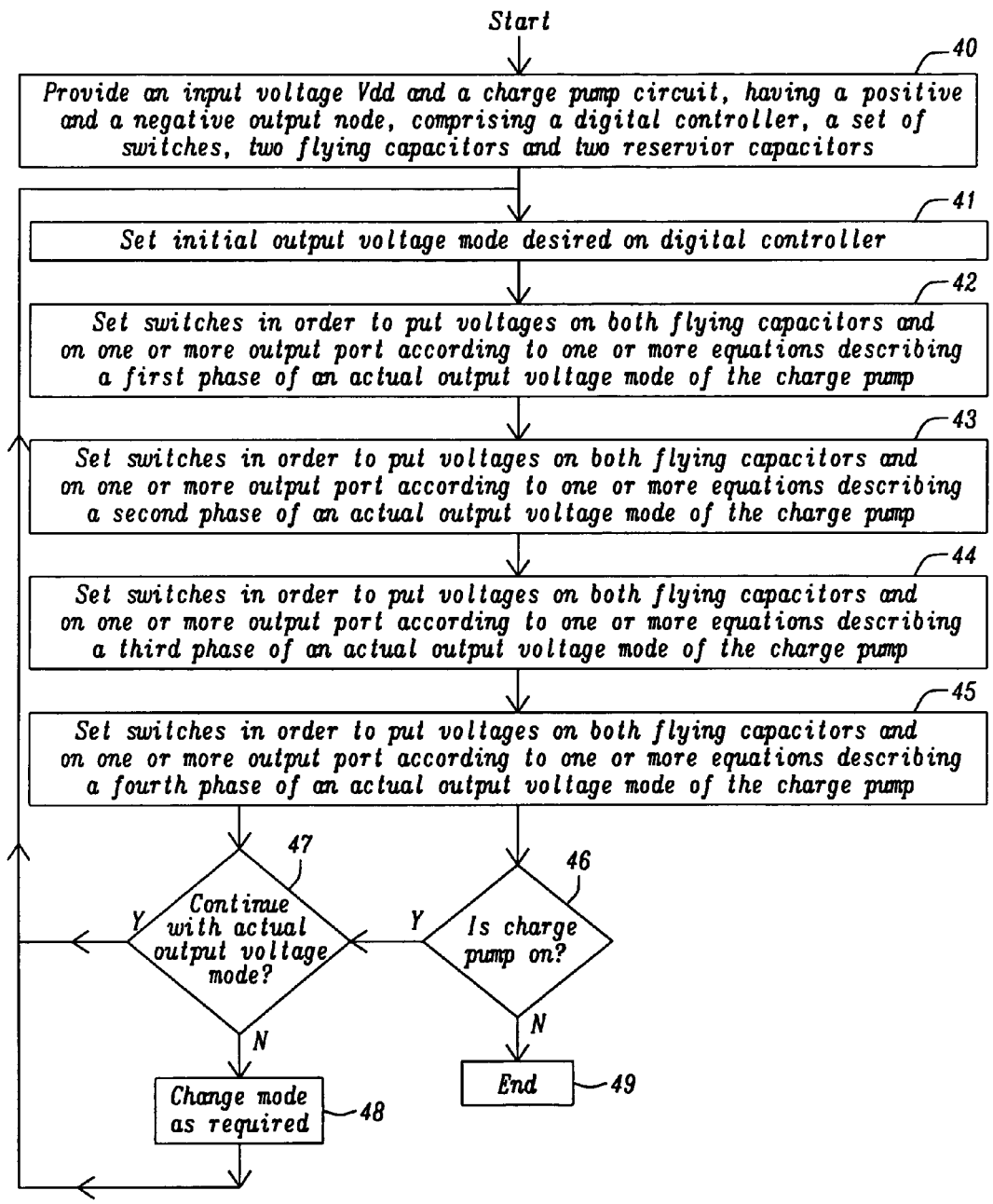
FIG. 4 illustrates a flowchart of a method invented of generating energy efficient supply voltages being symmetrical around ground voltage.

FIG. 4 illustrates a flowchart of a method invented of generating energy efficient supply voltages being symmetrical around ground voltage. A first step 40 describes the provision of an input voltage Vdd and a charge pump circuit, having a positive and a negative output node, comprising a digital controller, a set of switches, two flying capacitors, and two reservoir capacitors. The next step 41 depicts the setting of output voltage mode desired on the digital controller. The digital controller controls the charge pump in a way that just the amount of power, required by a stage supplied by the charge pump, is provided by the charge pump. In a preferred embodiment of the invention where the charge pump is supplying a class-G audio amplifier the amount of power is according to gain setting, i.e. the audio volume. The following step 42 illustrates setting switches in order to put voltages on both flying capacitors and on one or more output port according to one or more equations describing a first phase of an actual output voltage mode of the charge pump. Step 43 describes setting switches in order to put voltages on both flying capacitors and on one or more output port according to one or more equations describing a second phase of an actual output voltage mode of the charge pump. Step 44 discloses setting switches in order to put voltages on both flying capacitors and on one or more output port according to one or more equations describing a third phase of an actual output voltage mode of the charge pump. Step 45 illustrates setting switches in order to put voltages on both flying capacitors and on one or more output port according to one or more equations describing a fourth phase of an actual output voltage mode of the charge pump. Step 46 is a check if the charge pump is still on, if it so, the process flow goes to step 47, else the process flow goes to step 39, which describes the end of the process. Step 47 is a check if the process will be continued with the actual output voltage mode, if it so, the process flow will go back to step 42, else the process flow goes to step 48. In step 48 the output voltage mode will be set by the controller as required and the process flow goes to step 42.

In summary, the charge pump invented operates to reach Steady State to satisfy each phase and such to solve a correspondent set of equations. In this way the charge pump provides certain ideal voltage, which is +−vdd/6, +−vdd/5, +−Vdd/4, +−Vdd/3, etc, without consuming extra significant power. Power saving and efficiency is reached by a conversion that does not need linear resistance. The charge pump acts as transformer transforming input power Pin=Vdd×Idd (supply voltage×supply current) to output power Pout=Vout× Iout, wherein as Vout=Vdd/6 to satisfy power equilibrium (in lossless case) Pin=Pout then Iload=6×Idd. Of course there are losses due to resistance of switches, and also due to principles of charge pump operations.

In order to reduce power dissipation in case of Class (H) amplifiers the lowest available supply voltage (efficiently generated by a DC-DC converter) should be used. Due to the availability of different supply voltages for an output stage by the present invention the power consumption is minimized. A class G amplifier operates more efficiently for low signal amplitude below Vdd/6 or Vdd/5 supply voltages.

While the invention has been particularly shown and described with reference to the preferred embodiments thereof, it will be understood by those skilled in the art that various changes in form and details may be made without departing from the spirit and scope of the invention.

What is claimed is:

1. A method for generating from a single supply voltage Vdd energy efficient supply voltages, comprising values of Vdd/6 and Vdd/5 being symmetrical around ground voltage, comprising the following steps:
   (1) providing an input voltage Vdd and a charge pump circuit, having a positive and a negative output node, comprising a digital controller, a set of switches, at most two flying capacitors, and two reservoir capacitors;
   (2) setting output voltage modes desired on the digital controller, comprising values of Vdd/6 and Vdd/5 being symmetrical around ground voltage;
   (3) setting switches in order to put voltages on the at most two flying capacitors and on at least one output port according to one or more equations describing a first phase of an actual output voltage mode of the charge pump;
   (4) setting switches in order to put voltages on the at most two flying capacitors and on at least one output port according to one or more equations describing a second phase of an actual output voltage mode of the charge pump;
   (5) setting switches in order to put voltages on the at most flying capacitors and on one or more output port according to one or more equations describing a third phase of an actual output voltage mode of the charge pump;
   (6) setting switches in order to put voltages on the at most two flying capacitors and on one or more output port according to one or more equations describing a fourth phase of an actual output voltage mode of the charge pump;
   (7) go to step (8) if charge pump is on, else go to step (10);
   (8) go to step (9) if output voltage mode is to be changed, else go to step (3);
   (9) change output voltage mode and go to step (3); and
   (10) end.

2. The method of claim 1 wherein said switches comprise NMOS switches.

3. The method of claim 1 wherein the output voltage modes are set according to gain setting of a stage supplied by the charge pump.

4. The method of claim 3 wherein output voltages of a value of ±⅙ Vdd, ±⅕ Vdd, ±¼ Vdd, ±⅓ Vdd, ±½ Vdd, or ±Vdd voltage can be achieved.

5. The method of claim 1 wherein the equations describing four phases of a ±⅕ Vdd output voltage mode comprise:
   Phase 1: A) The voltage across a first flying capacitor of the at most two flying capacitors+the voltage across a second flying capacitor of the at most two flying capacitors+ the voltage of the positive output node=Vdd;
   Phase 2: B) The voltage across the first flying capacitor=the sum of the voltages on the positive and negative output nodes+the voltage across the second flying capacitor;
   Phase 3: C) The voltage across the second flying capacitor=the voltage of the negative output node; and
   Phase 4: D) The voltage across the second flying capacitor=the voltage of the positive output node;
   wherein the solution of these equations for the +/−Vdd/5 output voltage mode yields:
   the voltage across the first flying capacitor=⅗ Vdd, the voltage across the second flying capacitor=Vdd/5, the voltage of the positive output node=Vdd/5, and the voltage of the negative output node=−Vdd/5.

6. The method of claim 1 wherein the equations describing four phases of a ±⅙ Vdd output voltage mode are:
   Phase 1: A) the voltage across a first flying capacitor of the at most two flying capacitors+the voltage across a second flying capacitor of the at most two flying capacitors+ the voltage of the positive output node=Vdd;
   Phase 2: B) the voltage across the first flying capacitor=the voltage across the second flying capacitor+the voltage on the positive output node;
   Phase 3: C) the voltage across the first flying capacitor=the voltage across the second flying capacitor+the voltage on the negative output node;
   Phase 4: D) the voltage across the second flying capacitor=the voltage on the positive output node+the voltage on the negative output node;
   wherein the solution of these equations for the +/−Vdd/6 output voltage mode yields:
   the voltage across the first flying capacitor=⅚ Vdd, the voltage across the second flying capacitor=⅔ Vdd, the voltage on the positive output node=Vdd/6, the voltage on the negative output node=−Vdd/6.

7. The method of claim 1 wherein a detection circuit at the output nodes of the charge pump detects a drop of voltage due to load and based on this the frequency of charge pump is adjusted by the digital controller.

8. The method of claim 7 wherein a size of switches is reduced in order to reduce power consumption in case a set minimum frequency is reached.

9. The method of claim 8 wherein each switch of said set of switches is implemented by a number of switches in parallel in order to be capable to reduce the size of switches.

10. The method of claim 9 wherein each switch of the set of switches comprises five switches in parallel.

11. The method of claim 1 wherein the four phases of an output voltage mode of the charge pump have a fixed duration.

12. The method of claim 11 wherein said fixed duration is 500 ns.

13. A charge pump generating energy efficient supply voltages having a value of fractions of VDD voltage, comprising values of Vdd/6 and Vdd/5, being symmetrical around ground voltage, comprises:
   a digital controller, controlling the operation of the charge pump in a way that the charge pump is providing just the amount of power required by a stage supplied by the charge pump;
   a first input port connected to Vdd voltage;
   a second input port connected to ground;
   a positive output node;
   a negative output node;
   two reservoir capacitors, wherein a first reservoir capacitor is connected between the positive output node of the charge pump and ground and a second reservoir capacitor is connected between the negative output node of the charge pump and ground;
   at most two flying capacitors; and
   a set of switches activating charging of the at most two flying capacitors and connecting first or second plates of the at most two flying capacitors to the positive and negative output nodes wherein the set of switches and the related charging of the at most two flying capacitors are controlled by the digital controller in way that the positive and negative output nodes supply symmetrical output voltages required, wherein said switches can be set to provide output voltages comprising +/−Vdd/5 or +/−Vdd/6.

14. The charge pump of claim 13 wherein the charge pump output nodes supply ±⅙ Vdd, ±⅕ Vdd ±¼ Vdd, ±⅓ Vdd, ±½ Vdd or ±1 Vdd voltage.

15. The charge pump of claim 13 wherein said set of switches comprises 15 switches.

16. The charge pump of claim 13 wherein said set of switches comprises
   a first switch, wherein a first terminal is connected to the first input port and a second terminal is connected to the positive output node;
   a second switch, wherein a first terminal is connected to the first input port and a second terminal is connected to the first plate of a first flying capacitor of the at most two flying capacitors;
   a third switch, wherein a first terminal is connected to the second input port and a second terminal is connected to the first plate of the first flying capacitor;
   a fourth switch, wherein a first terminal is connected to the second input port and a second terminal is connected to the first plate of a second flying capacitor of the at most two flying capacitors;
   a fifth switch, wherein a first terminal is connected to the second input port and a second terminal is connected to a second terminal of an eleventh switch;
   a sixth switch, wherein a first terminal is connected to the first plate of the first flying capacitor and a second terminal is connected to the positive output node;
   a seventh switch, wherein a first terminal is connected to a first plate of the second flying capacitor and a second terminal is connected to the positive output node;
   an eighth switch, wherein a first terminal is connected to a second plate of the first flying capacitor and a second terminal is connected to the negative output node;
   a ninth switch, wherein a first terminal is connected to a second plate of the second flying capacitor and a second terminal is connected to the negative output node;
   a tenth switch, wherein a first terminal is connected to a second terminal of the fifth switch and a second terminal is connected to the positive output node;
   said eleventh switch, wherein a first terminal is connected to the second plate of the second flying capacitor;
   a twelfth switch, wherein a first terminal is connected to the second plate of the first flying capacitor and a second terminal is connected to a first terminal of a thirteenth switch;
   said thirteenth switch, wherein a first terminal is connected to a second terminal of a fourteenth switch and a second terminal is connected to the first plate of the second flying capacitor;
   said fourteenth switch, wherein a first terminal is connected to ground; and
   a fifteenth switch wherein a first terminal is connected to the first plate of the first flying capacitor and a second terminal is connected to the positive output node.

17. The charge pump of claim 16 wherein said first switch is a PMOS switch.

18. The charge pump of claim 16 wherein said second and thirteenth switches are NMOS switches with internal integrated charge pump, where an internal capacitor in each switch is charged to Vdd voltage and then connected between source and gate of a power NMOS switch to switch it ON, in order to switch OFF, the gate is shorted to source, wherein these switches are designed to operate only with terminal voltages between 0 to Vdd.

19. The charge pump of claim 16 wherein said sixth, seventh and fifteenth switches are NMOS switches with internal integrated charge pump, having a switchable bulk dependent upon an actual output voltage mode of the charge pump operation.

20. The charge pump of claim 16 wherein said eighth, ninth, eleventh, and twelfth switches are NMOS switches with an internal integrated charge pump and can operate with any voltage on switch terminal.

21. The charge pump of claim 13 wherein all components except the capacitors are integrated in an integrated circuit.

22. The charge pump of claim 13 wherein said controller controls the frequency of switch controls and the width of the switch devices in a way that the voltages generated on the output nodes are just enough for an audio signal to be correctly generated at the output of an audio amplifier supplied by the charge pump.

23. The charge pump of claim 13 wherein a detection circuit at the output nodes of the charge pump detects a drop of voltage due to load and based on this the frequency of charge pump is adjusted by the digital controller.

24. The charge pump of claim 23 wherein size of switches is reduced in order to reduce power consumption in case a set minimum frequency is reached.

25. The charge pump of claim 24 wherein each switch of said set of switches is implemented by a number of switches in parallel in order to be capable to reduce the size of switches.

26. The charge pump of claim 25 wherein each switch of the set of switches comprises five switches in parallel.

* * * * *